(12) United States Patent
Naruse et al.

(10) Patent No.: US 11,331,965 B2
(45) Date of Patent: May 17, 2022

(54) PNEUMATIC TIRE

(71) Applicant: The Yokohama Rubber Co., LTD., Tokyo (JP)

(72) Inventors: Masahiro Naruse, Hiratsuka (JP); Tatsuro Shinzawa, Hiratsuka (JP); Takashi Hoshiba, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 287 days.

(21) Appl. No.: 15/768,511

(22) PCT Filed: Oct. 11, 2016

(86) PCT No.: PCT/JP2016/080114
§ 371 (c)(1),
(2) Date: Apr. 13, 2018

(87) PCT Pub. No.: WO2017/065136
PCT Pub. Date: Apr. 20, 2017

(65) Prior Publication Data
US 2018/0297419 A1    Oct. 18, 2018

(30) Foreign Application Priority Data
Oct. 15, 2015    (JP) .............................. JP2015-203550

(51) Int. Cl.
*B60C 19/00*    (2006.01)
*B60C 5/00*    (2006.01)

(52) U.S. Cl.
CPC .............. *B60C 19/002* (2013.01); *B60C 5/00* (2013.01)

(58) Field of Classification Search
CPC .................................................... B60C 19/002
See application file for complete search history.

(56) References Cited

U.S. PATENT DOCUMENTS

2006/0108042 A1* 5/2006 Yukawa .................... B60B 3/04
152/450
2006/0231185 A1* 10/2006 Tanno .................. B60C 19/002
152/450

(Continued)

FOREIGN PATENT DOCUMENTS

| CN | 1899862 | 1/2007 |
| DE | 198 06 935 | 9/1999 |

(Continued)

OTHER PUBLICATIONS

International Search Report for International Application No. PCT/JP2016/080114 dated Jan. 17, 2017, 4 pages, Japan.

*Primary Examiner* — Timothy Kennedy
*Assistant Examiner* — Farah Taufiq
(74) *Attorney, Agent, or Firm* — Thorpe North & Western

(57) ABSTRACT

A pneumatic tire is provided, including: an annular-shaped tread portion extending in a tire circumferential direction; a pair of sidewall portions disposed on both sides of the tread portion; and a pair of bead portions disposed on an inner side in a tire radial direction of the sidewall portions; wherein a band-like sound absorbing member is adhered on an inner surface of the tread portion in the tire circumferential direction; and the band-like sound absorbing member has a plurality of cuts extending in two mutually intersecting directions, and of the cuts, a cut extending in one direction is a cut extending parallel with regard to a tire lateral direction or tire circumferential direction.

7 Claims, 6 Drawing Sheets

(56) References Cited

U.S. PATENT DOCUMENTS

| | | | |
|---|---|---|---|
| 2007/0017619 A1* | 1/2007 | Yukawa | ................ B60C 19/002 |
| | | | 152/450 |
| 2008/0251178 A1 | 10/2008 | Yukawa et al. | |
| 2008/0251186 A1 | 10/2008 | Yukawa et al. | |
| 2009/0277549 A1 | 11/2009 | Tanno | |
| 2016/0288588 A1 | 10/2016 | Tanno | |
| 2016/0339749 A1* | 11/2016 | Yukawa | ................ B60C 19/002 |

FOREIGN PATENT DOCUMENTS

| | | | |
|---|---|---|---|
| JP | 2003-285607 | 10/2003 | |
| JP | 2006-143021 | 6/2006 | |
| JP | 2008-308089 | 12/2008 | |
| JP | 4281874 | 6/2009 | |
| JP | 2009-292462 | 12/2009 | |
| JP | 5267288 | 8/2013 | |
| JP | 2015-107691 | 6/2015 | |
| JP | 6120887 B2 * | 4/2017 | ........... B60C 19/002 |
| WO | WO 2005/012007 | 2/2005 | |
| WO | WO 2015/076380 | 5/2015 | |
| WO | WO 2015/118707 | 8/2015 | |

* cited by examiner

PNEUMATIC TIRE

TECHNICAL FIELD

The present technology relates to a pneumatic tire, and particularly relates to a pneumatic tire that can promote heat dissipation from a band-like sound absorbing member, and improve high-speed durability, as well as relieving stress occurring on the band-like sound absorbing member during a rolling motion, and improving the durability of the band-like sound absorbing member, by providing a cut on the band-like sound absorbing member adhered to an inner surface of the tire.

BACKGROUND ART

Cavernous resonance caused by the vibration of the air filled in a cavity portion of a tire is one cause of tire noise. Cavernous resonance is caused by a tread portion of a tire contacting a road surface during vehicle travel vibrating due to unevenness on the road surface, and the vibration is caused by air inside a cavity portion of a tire vibrating. The cavernous resonance has a frequency range where noise is generated, and reducing the noise level of the frequency range is important in order to reduce tire noise.

Attaching a sound absorbing member including a porous material such as a sponge or the like to an inner circumferential surface of a tread portion on a tire inner surface by an elastic fixed band has been proposed as a method of reducing noise due to the cavernous resonance phenomenon (for example, refer to Japanese Patent No. 4281874). However, in a case where securing the sound absorbing member is dependent on the elastic fixed band, problems occur where the elastic fixed band deforms during high speed travel.

In contrast, a method of directly adhering and securing a band-like sound absorbing member to a tire inner surface has been proposed (for example, refer to Japanese Patent No. 5267288). However, in this case, the band-like sound absorbing member is directly applied to a tire inner surface, and therefore, problems occur where heat accumulation is generated on a tread portion, and high-speed durability deteriorates due to heat accumulation. Furthermore, in a case where the band-like sound absorbing member is directly applied on a tire inner surface, problems occur where the band-like sound absorbing member cannot follow tire deflection and therefore is damaged.

SUMMARY

The present technology provides a pneumatic tire that can promote heat dissipation from a band-like sound absorbing member, and improve high-speed durability, as well as reliving stress occurring on the band-like sound absorbing member during a rolling motion, and improving the durability of the band-like sound absorbing member, by providing a cut on the band-like sound absorbing member adhered to an inner surface of the tire.

A pneumatic tire of the present technology includes: an annular-shaped tread portion extending in a tire circumferential direction; a pair of sidewall portions disposed on both sides of the tread portion; and a pair of bead portions disposed on an inner side in a tire radial direction of the sidewall portions; wherein a band-like sound absorbing member is adhered on an inner surface of the tread portion in the tire circumferential direction; and the band-like sound absorbing member has a plurality of cuts extending in two mutually intersecting directions, and of the cuts, a cut extending in one direction is a cut extending parallel with regard to a tire lateral direction or tire circumferential direction.

With the present technology, a plurality of cuts extending in two mutually intersecting directions are provided on a band-like sound absorbing member, and therefore, the cuts on the band-like sound absorbing member can open and follow the deformation of a tire when the tire deflects during a rolling motion, relieve stress generated on the band-like sound absorbing member, and suppress damaging of the band-like sound absorbing member. Thereby, the durability of the band-like sound absorbing member can be improved. Furthermore, during repeated deformation, the band-like sound absorbing member opens, and an apparent gauge of the band-like sound absorbing member is reduced in thickness, and therefore, heat dissipation from the band-like sound absorbing member can be promoted, and high-speed durability of the pneumatic tire can be improved.

However, in a case where cuts extending in two mutually intersecting directions are provided on the band-like sound absorbing member, a force with regard to a tire circumferential direction acts on blocks demarcated by the cuts during a rolling motion, and thus collapsing of the blocks occurs. The collapsing of the blocks repeatedly occurs during a rolling motion, and therefore, the blocks rub against each other, which is a factor leading to damaging of the band-like sound absorbing member. In particular, in a case where only inclined cuts are provided without providing cuts extending in a tire lateral direction or tire circumferential direction, the blocks are subjected to stress with regard to the tire circumferential direction based on collapsing of two blocks positioned forward in a rotational direction, and therefore, collapsing of the blocks subjected to the stress increases, and thus the band-like sound absorbing member is prone to further damage. Therefore, of the cuts extending in two directions, a cut extending in one direction is set as a cut extending in a parallel manner to the tire circumferential direction or tire lateral direction, and therefore, only stress with regard to the tire circumferential direction from one block positioned forward in the rotation direction is received, and thus collapsing of the blocks can be suppressed. Thereby, rubbing of the blocks is relieved, and thus damage of the band-like sound absorbing member can be even further suppressed.

An interval t of the cuts is preferably from 5% to 90%, and more preferably from 15% to 30% with regard to a width Ws of the band-like sound absorbing member. Thereby, the cuts of the band-like sound absorbing member can open and follow deformation of the tire during a ground-contacting rolling motion in a condition with high tire deflection, relieve stress generated on the band-like sound absorbing member, and suppress damaging of the band-like sound absorbing member. As a result, the durability of the band-like sound absorbing member can be improved.

A depth d of the cuts is preferably from 20% to 80%, and more preferably from 30% to 60% with regard to a thickness D of the band-like sound absorbing member. Thereby, the cuts of the band-like sound absorbing member can open during a rolling motion, promote heat dissipation from the band-like sound absorbing member, and improve the high-speed durability of the pneumatic tire. Furthermore, damaging of the band-like sound absorbing member caused by a ground-contacting rolling motion in a condition with a high tire deflection can be effectively suppressed.

A volume of the band-like sound absorbing member is preferably from 10% to 30% with regard to the luminal volume of the tire. Thereby, a sound absorbing effect based on the band-like sound absorbing member can be even further achieved. An excellent noise reducing effect can be achieved by increasing the volume of the band-like sound absorbing member, and a favorable stress relieving effect and heating dissipating effect can be demonstrated even with a large band-like sound absorbing member. The luminal volume of the tire is a volume of a cavity portion formed between a tire and rim in a condition where the tire is mounted on a regular rim and inflated to a regular internal pressure. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). However, when the tire is an original equipment tire, the luminal volume of the tire is calculated using a genuine wheel to which the tire is assembled. "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

The band-like sound absorbing member preferably has a missing portion in at least one section in the tire circumferential direction. Thereby, long-term resistance is possible against expansion due tire inflation and shear strain of an adhering surface caused by a ground-contacting rolling motion.

BRIEF DESCRIPTION OF DRAWINGS

FIGS. 5A to 5D are developed views of the modified examples.

DETAILED DESCRIPTION

Figure 1:
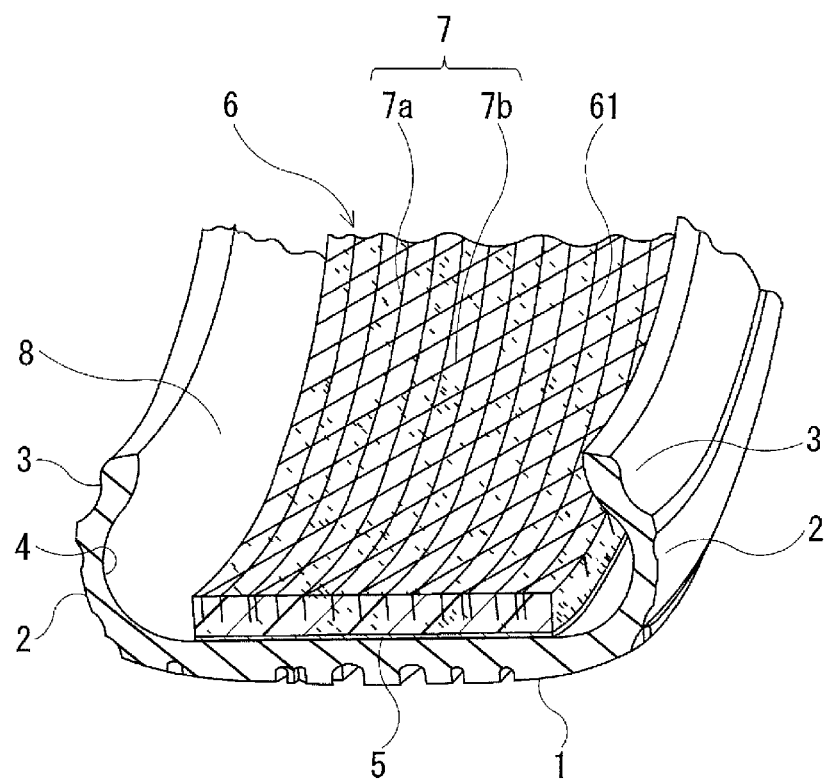
FIG. 1 is a perspective cross-sectional view of a pneumatic tire according to an embodiment of the present technology.
Figure 2:
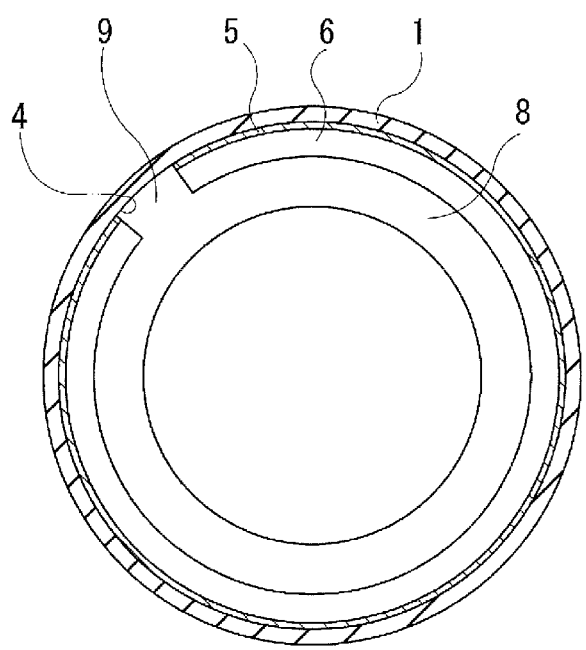
FIG. 2 is a cross-sectional view of an equator line illustrating a pneumatic tire according to an embodiment of the present technology.

A configuration of the present technology will be described in detail below while referring to the attached drawings. FIG. 1 and FIG. 2 illustrate a pneumatic tire according to an embodiment of the present technology. As illustrated in FIG. 1, the pneumatic tire according to the present embodiment includes an annular-shaped tread portion 1 extending in a tire circumferential direction, a pair of sidewall portions 2 disposed on both sides of the tread portion 1, and a pair of bead portions 3 disposed on an inner side in a tire radial direction of the sidewall portions 2.

In the aforementioned pneumatic tire, a band-like sound absorbing member 6 is adhered via an adhesive layer 5 along the tire circumferential direction to a region of a tire inner surface 4 corresponding to the tread portion 1. The band-like sound absorbing member 6 is made of open-cell porous material and has predetermined noise absorbing properties based on the porous structure. Polyurethane foam may be used as the porous material of the band-like sound absorbing member 6. On the other hand, a double-sided adhesive tape is preferable as the adhesive layer 5.

Figure 3:
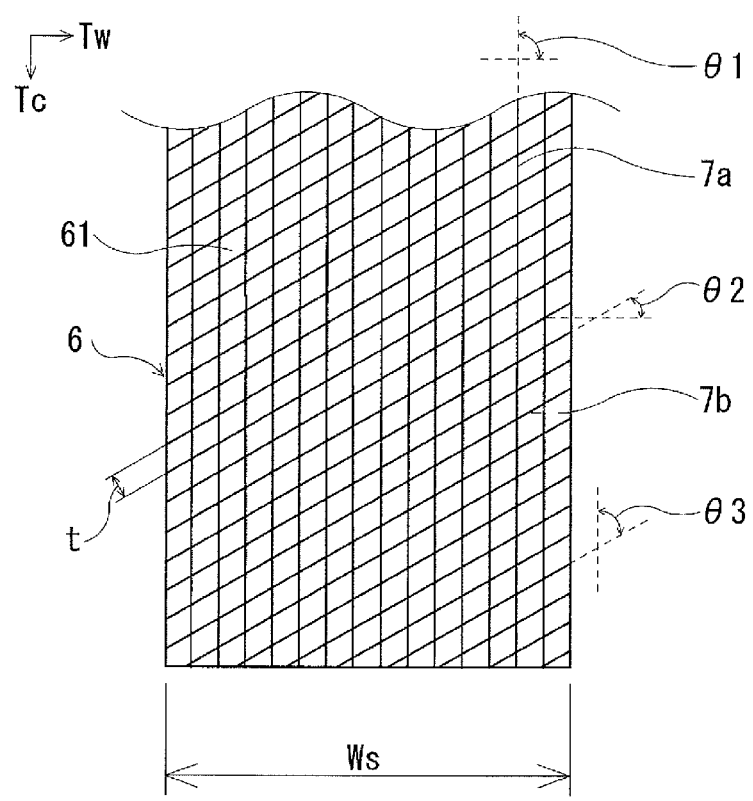
FIG. 3 is a developed view illustrating a portion of a band-like sound absorbing member adhered to an inner surface of a pneumatic tire of the present technology.

A plurality of cuts 7 extending in two mutually intersecting directions are formed on the band-like sound absorbing member 6. Of the cuts 7, the cut 7 extending parallel with a tire lateral direction or the tire circumferential direction is set as a first cut 7a, and the cut 7 extending in a different direction than the first cut 7a is set as a second cut 7b. Furthermore, as illustrated in FIG. 3, an angle with regard to the tire lateral direction of the first cut 7a is set as angle θ1, an angle with regard to the tire lateral direction of the second cut 7b is set as angle θ2, and an angle formed by the first cut 7a and second cut 7b is set as angle θ3. At this time, the angle θ3 formed by the first cut 7a and second cut 7b is expressed as an angle on an acute angle side. Note that in FIG. 3, Tc represents the tire circumferential direction, and the Tw represents the tire width direction.

In other words, the first cut 7a with a 0° or 90° angle θ1 and the second cut 7b having the angle θ2 are disposed on the band-like sound absorbing member 6. FIG. 3 illustrates a case where the first cut 7a with a 90° angle θ1 and the second cut 7b with a 30° angle θ2 are disposed, and at this time, angle θ3 is 60°.

In the aforementioned pneumatic tire, the angle θ2 is not particularly limited, but in a case where the angle θ1 of the first cut 7a is 0°, the absolute value of the angle θ2 of the second cut 7b is preferably within a range of 15° to 90°, and more preferably within a range of 60° to 90°. On the other hand, in a case where the angle θ1 of the first cut 7a is 90°, the absolute value of the angle θ2 of the second cut 7b is preferably within a range of 0° to 75°. Furthermore, the absolute value of the angle θ3 is preferably within a range of 15° to 90°, and more preferably within a range of 30° to 60°. The plurality of the first cut 7a and second cut 7b extending in two mutually intersecting directions is provided on the band-like sound absorbing member 6, and therefore, the first cut 7a and second cut 7b of the band-like sound absorbing member 6 can open and follow the deformation of a tire when the tire deflects during a rolling motion, relieve stress generated on the band-like sound absorbing member 6, and suppress damaging of the band-like sound absorbing member 6. As a result, the durability of the band-like sound absorbing member 6 can be improved. Furthermore, during repeated deformation, the first cut 7a and second cut 7b of the band-like sound absorbing member 6 open, and thus and an apparent gauge of the band-like sound absorbing member 6 is reduced in thickness, and therefore, heat dissipation from the band-like sound absorbing member 6 can be promoted, and high-speed durability of the pneumatic tire can be improved.

Figure 6A:
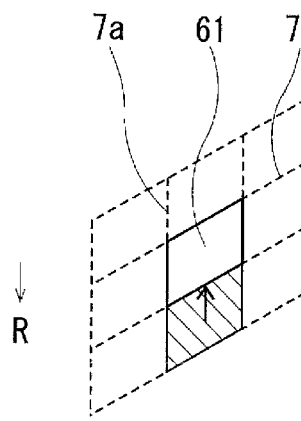
FIGS. 6A and 6B are schematic views illustrating a portion of a band-like sound absorbing member adhered to an inner surface of a pneumatic tire.
Figure 6B:
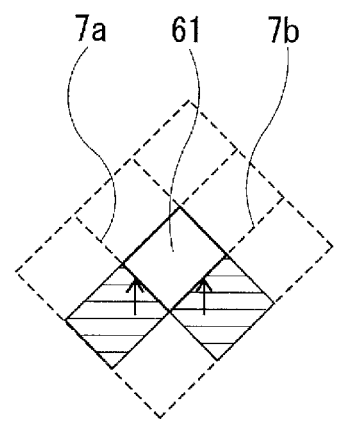

FIG. 6A illustrates a block 61 of a portion of the band-like sound absorbing member 6 demarcated by the first cut 7a with a 90° angle θ1 and second cut 7b with a 30° angle θ2, and FIG. 6B illustrates the block 61 of a portion of the band-like sound absorbing member 6 demarcated by the first cut 7a and second cut 7b with a 45° angle for angle θ1 and angle θ2 as a comparative example of the present technology.

Herein, a force with regard to the tire circumferential direction acts during a rolling motion on the blocks 61 of the band-like sound absorbing member 6 demarcated by the first cut 7a and second cut 7b, and thus collapsing of the blocks 61 occurs. The collapsing of the blocks 61 repeatedly occurs during a rolling motion, and therefore, the blocks 61 rub against each other, which is a factor leading to damaging of the band-like sound absorbing member 6. As illustrated in FIG. 6A, of the first cut 7a and second cut 7b extending in two directions, the first cut 7a is configured so as to extend parallel with the tire circumferential direction or tire lateral direction, such that stress with regard to the tire circumferential direction subjected to the blocks 61 is limited to one block 61 (one diagonally shaded block 61) positioned forward in the rotation direction R, and therefore, collapsing of the block 61 can be suppressed. Thereby, rubbing of the blocks 61 is relieved, and thus damage of the band-like sound absorbing member 6 can be even further suppressed. On the other hand, as illustrated in FIG. 6B, in a case where a first cut 7a and second cut 7b where both are not cuts extending parallel with the tire lateral direction or tire circumferential direction are provided, the blocks 61 are subject to stress with regard to the tire circumferential direction due to collapsing of two blocks 61 (two diagonally shaded blocks 61) positioned forward in the rotation direction R, and therefore, collapsing of the block 61 subject to the stress increases, and thus the band-like sound absorbing member 6 is prone to further damage.

As illustrated in FIG. 3, an interval between the cuts 7 is set as interval t. At this time, the interval t of the cuts 7 is preferably from 5% to 90%, and more preferably from 15% to 30% with regard to a width Ws of the band-like sound absorbing member 6. "Interval t" as referred to herein is an interval between cuts 7 extending in the same direction. Furthermore, the interval of the cuts 7 on the band-like sound absorbing member 6 may be randomly disposed, but the cuts 7 are more preferably disposed at equal intervals with constant intervals t of the cuts 7 on the band-like sound absorbing member 6, from the perspective of being able to uniformly correspond tensile strain in each direction. Thereby, the cuts 7 of the band-like sound absorbing member 6 can open and follow deformation of the tire during a ground-contacting rolling motion in a condition with high tire deflection, relieve stress generated on the band-like sound absorbing member 6, and suppress damaging of the band-like sound absorbing member 6. As a result, the durability of the band-like sound absorbing member 6 can be improved.

Figure 4:
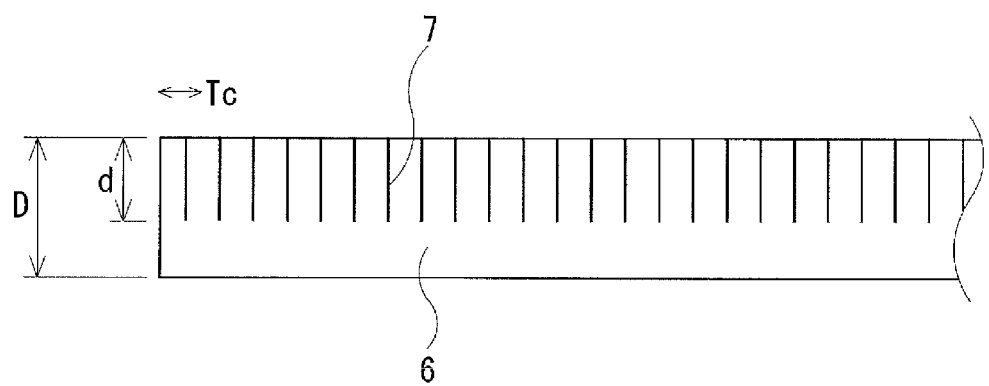
FIG. 4 is a cross-sectional view in a tire circumferential direction of the sound absorbing member in FIG. 3.

FIG. 4 is a cross-sectional view in the tire circumferential direction of the band-like sound absorbing member 6. A depth of the cuts 7 is set as a depth d, and a thickness of the band-like sound absorbing member 6 is set as a thickness D. At this time, a depth d of the cuts 7 is preferably from 20% to 80%, and more preferably from 30% to 60% with regard to a thickness D of the band-like sound absorbing member 6. Thereby, the cuts 7 of the band-like sound absorbing member 6 can open during ground contact, promote heat dissipation from the band-like sound absorbing member 6, and improve the high-speed durability of the pneumatic tire. Furthermore, damaging of the band-like sound absorbing member 6 caused by a ground-contacting rolling motion in a condition with a high tire deflection can be effectively suppressed. Herein, when the depth d of the cuts 7 is too shallow, heat dissipation from the band-like sound absorbing member 6 is reduced, and thus high-speed durability of the tire deteriorates. On the other hand, when the depth d of the cuts 7 is too deep, the band-like sound absorbing member 6 tends to become prone to damage during a rolling motion at a low temperature.

In the aforementioned pneumatic tire, a volume of the band-like sound absorbing member 6 is preferably from 10% to 30% with regard to the luminal volume of a tire. Furthermore, the width Ws of the band-like sound absorbing member 6 is more preferably from 30% to 90% with regard to a tire ground contact width. Thereby, a sound absorbing effect based on the band-like sound absorbing member 6 can be even further achieved. Herein, when the volume of the band-like sound absorbing member 6 is less than 10% with regard to the luminal volume of the tire, a sound absorbing effect cannot be appropriately achieved. Furthermore, when the volume of the band-like sound absorbing member 6 exceeds 30% with regard to the luminal volume of the tire, the reducing effect against noise due to the cavernous resonance phenomenon will be constant, and a further reducing effect cannot be expected.

Furthermore, as illustrated in FIG. 2, the band-like sound absorbing member 6 preferably has a missing portion 9 in at least one section in the tire circumferential direction. The missing portion 9 is a portion where the band-like sound absorbing member 6 is not present on a tire circumference. By providing the missing portion 9 on the band-like sound absorbing member 6, long-term resistance is possible against expansion due to tire inflation and shear strain of an adhering surface caused by a ground-containing rolling motion, and shear strain generated on the adhering surface of the band-like sound absorbing member 6 can be effectively relieved. The missing portion 9 is preferably provided at one or three to five sections on the tire circumference. In other words, when the missing portion 9 is provided on two sections on the tire circumference, tire uniformity significantly deteriorates due to mass unbalance, and when the missing portion 9 is provided on 6 sections or more, manufacturing cost significantly increases.

Note that if the missing portion 9 is provided on two or more sections on the tire circumference, the band-like sound absorbing member 6 is interrupted in the tire circumferential direction. However, even in this case, for example, in a case where a plurality of the band-like sound absorbing members 6 are mutually connected by another laminate such as an adhesive layer 5 formed from a double-side adhesive tape, the band-like sound absorbing members 6 can be handled as an integral member, and therefore, the work of applying to the tire inner surface 4 can be easily performed.

Figure 5A:
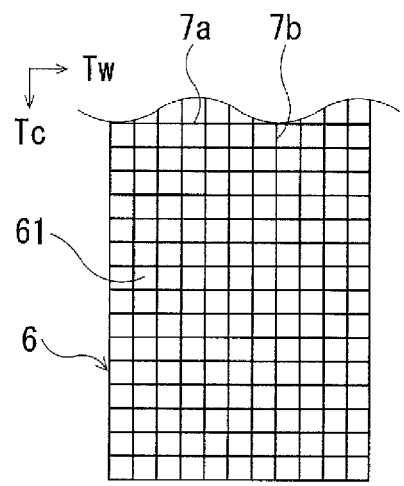
FIG. 5A to 5D illustrate modified examples of cuts of a band-like sound absorbing member adhered to an inner surface of a pneumatic tire of the present technology.
Figure 5B:
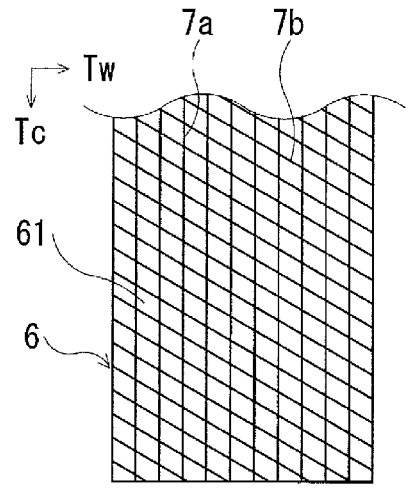
Figure 5C:
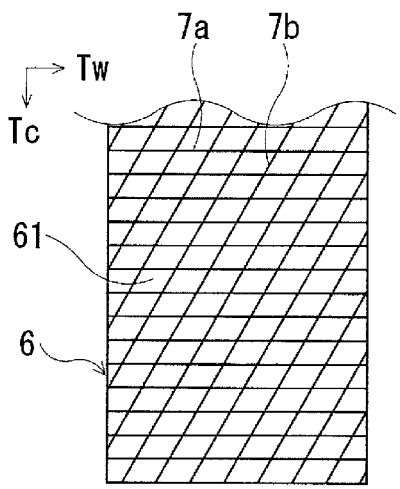
Figure 5D:
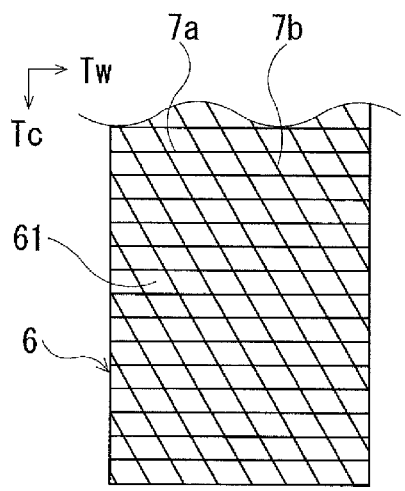

In addition to FIG. 1, the cuts 7 can be such that the first cut 7a extending parallel with the tire lateral direction and second cut 7b extending parallel with the tire circumferential direction are disposed as illustrated in FIG. 5A, or such that the first cut 7a extending in the tire circumferential direction and the second cut 7b with an absolute value of the angle θ2 of 30° are disposed as illustrated in FIG. 5B. Furthermore, the cuts 7 can also be such that the first cut 7a extending in the tire lateral direction and the second cut 7b with an absolute value of the angle θ2 of 60° are disposed as illustrated in FIG. 5C and FIG. 5D.

The present technology is further described below by examples, but the scope of the present technology is not limited to these examples.

EXAMPLES

Tires of Examples 1 to 20 having a plurality of cuts extending in two mutually intersecting directions on a band-like sound absorbing member were prepared for a pneumatic tire provided with an annular-shaped tread portion extending in a tire circumferential direction, a pair of sidewall portions disposed on both sides of the tread portion, and a pair of bead portions disposed on an inner side in a tire radial direction of the sidewall portions, at a tire size of 275/35ZR20, where a band-like sound absorbing member is adhered on an inner surface of the tread portion in the tire circumferential direction, and the band-like sound absorbing member has a plurality of cuts extending in two mutually intersecting directions.

In Examples 1 to 20, the presence/absence of a cut, angle θ1 with regard to the tire lateral direction of the first cut, angle θ2 with regard to the tire later direction of the second cut, interval of the cuts (interval t/width Ws×100%), and depth of the cuts (depth d/thickness D×100%) were set as shown in Table 1-1 and Table 1-2.

For comparison, tires of conventional examples were prepared without providing any cuts in the band-like sound absorbing member. Furthermore, a tire of Comparative Example 1 having the same structure as Example 1 was prepared except that the shape of the cuts was a rectangular groove extending in the tire lateral direction, and a tire of Comparative Example 2 having the same structure as Example 1 was prepared except that only a plurality of cuts extending in the tire lateral direction were provided. Furthermore, a tire of Comparative Example 3 having the same structure as Example 1 was prepared except that only a plurality of cuts extending in the tire circumferential direction, and a tire of Comparative Example 4 having the same structure as Example 1 was prepared except that the cuts were disposed to mutually intersect at an angle of 45° with regard to the tire lateral direction.

For these test tires, the high-speed durability, durability of the band-like sound absorbing member during high strain, durability of the band-like sound absorbing member at a low temperature (−20° C.), and collapsing of a block of the band-like sound absorbing member were evaluated, and the results thereof are collectively shown in Table 1-1 and Table 1-2.

High-Speed Durability:

The test tires were assembled on wheels having a rim size of 20×9½J, and then subjected to a traveling test on a drum testing machine under testing conditions where the air pressure was 360 kPa and the load was 5 kN. Specifically, an initial speed was 250 km/h, the speed was increased by 10 km/h every 20 minutes, and the tire was run until failure occurred, and the reached step (speed) was measured. The results are shown in Table 1-1 and Table 1-2.

Durability of Band-Like Sound Absorbing Member During High Strain:

The test tires were assembled on wheels having a rim size of 20×9½J, and subjected traveling test on a drum testing machine under testing conditions where the traveling speed was 80 km/h, the air pressure was 160 kPa, the load was 8.5 kN, and the traveling distance was 6000 km, and then peeling of the adhering surface on the band-like sound absorbing member or presence/absence of damage on the band-like sound absorbing member was visually observed. The results are shown in Table 1-1 and Table 1-2. For the aforementioned items, cases where no dropout or damage occurred were denoted as "Excellent"; cases where peeling of the adhering surface or damaging of the band-like sound absorbing member occurred in a portion but was not problem were denoted as "Good"; cases where peeling of the adhering surface or damaging of the band-like sound absorbing member occurred on ¼ or less of the entire band-like sound absorbing member were denoted with "Fair"; and cases where peeling of the adhering surface or damaging of the band-like sound absorbing member occurred on ¼ or more of the entire band-like sound absorbing member were denoted as "Poor".

Durability at a Low Temperature (−20° C.):

The test tires were assembled on wheels having a rim size of 20×9½J, and subjected traveling test on a drum testing machine under testing conditions where the traveling speed was 80 km/h, the air pressure was 160 kPa, the load was 5 kN, and the traveling distance was 6,000 km, and then peeling of the adhering surface on the band-like sound absorbing member or presence/absence of damage on the band-like sound absorbing member was visually observed.

The results are shown in Table 1-1 and Table 1-2. For the aforementioned items, cases where no dropout or damage occurred were denoted as "Excellent"; cases where peeling of the adhering surface or damaging of the band-like sound absorbing member occurred in a portion but was not problem were denoted as "Good"; cases where peeling of the adhering surface or damaging of the band-like sound absorbing member occurred on ¼ or less of the entire band-like sound absorbing member were denoted as "Fair"; and cases where peeling of the adhering surface or damaging of the band-like sound absorbing member occurred on ¼ or more of the entire band-like sound absorbing member were denoted as "Poor".

Collapsing of Block of Band-Like Sound Absorbing Member:

The test tires were assembled on wheels having a rim size of 20×9½J, and then subjected to a traveling test on a drum testing machine under testing conditions where the air pressure was 360 kPa and the load was 5 kN. Specifically, an initial speed was 250 km/h, the speed was increased by 10 km/h every 20 minutes, and the tire was run until a speed of 310 km/h was achieved, and then the presence/absence of damaging on the band-like sound absorbing member due to collapsing of a block on the band-like sound absorbing member was visually confirmed. The results are shown in Table 1-1 and Table 1-2. For the aforementioned items, cases where no damage of the band-like sound absorbing member occurred were denoted as "Excellent"; cases where damaging of the band-like sound absorbing member occurred in a portion but was not problem were denoted as "Good"; and cases where damaging of the band-like sound absorbing member occurred on ¼ or less of the entire band-like sound absorbing member were denoted as "Fair".

TABLE 1-1-1

|  | Conventional example | Comparative Example 1 | Comparative Example 2 |
|---|---|---|---|
| Presence/absence of cuts | Absence | Presence | Presence |
| Angle θ1 of first cut with regard to tire lateral direction | — | 0° | 0° |
| Angle θ2 of second cut with regard to tire lateral direction | — | — | — |
| Interval of cuts (Interval t/width Ws × 100%) | — | 5% | 5% |
| Depth of cuts (Depth d/thickness D × 100%) | — | 20% | 20% |
| High-speed durability (reached speed: km/h) | 310 | 330 | 320 |
| Durability of band-like sound absorbing member — During high strain | Poor | Fair | Fair |
| Durability of band-like sound absorbing member — At low temperature (−20° C.) | Poor | Fair | Fair |
| Collapsing of block of band-like sound absorbing member | Excellent | Excellent | Excellent |

TABLE 1-1-2

|  | Comparative Example 3 | Comparative Example 4 |
|---|---|---|
| Presence/absence of cuts | Presence | Presence |
| Angle θ1 of first cut with regard to tire lateral direction | 90° | 45° |
| Angle θ2 of second cut with regard to tire lateral direction | — | 45° |
| Interval of cuts (Interval t/width Ws × 100%) | 5% | 5% |
| Depth of cuts (Depth d/thickness D × 100%) | 20% | 20% |
| High-speed durability (reached speed: km/h) | 320 | 340 |
| Durability of band-like sound absorbing member | During high strain | Poor | Good |
| | At low temperature (−20° C.) | Poor | Good |
| Collapsing of block of band-like sound absorbing member | Excellent | Fair |

TABLE 1-1-3

|  | Example 1 | Example 2 | Example 3 | Example 4 | Example 5 |
|---|---|---|---|---|---|
| Presence/absence of cuts | Presence | Presence | Presence | Presence | Presence |
| Angle θ1 of first cut with regard to tire lateral direction | 0° | 0° | 0° | 0° | 90° |
| Angle θ2 of second cut with regard to tire lateral direction | 90° | 60° | 30° | 15° | 75° |
| Interval of cuts (Interval t/width Ws × 100%) | 5% | 5% | 5% | 5% | 5% |
| Depth of cuts (Depth d/thickness D × 100%) | 20% | 20% | 20% | 20% | 20% |
| High-speed durability (reached speed: km/h) | 340 | 350 | 350 | 340 | 340 |
| Durability of band-like sound absorbing member During high strain | Good | Good | Good | Good | Good |
| Durability of band-like sound absorbing member At low temperature (−20° C.) | Good | Good | Good | Good | Good |
| Collapsing of block of band-like sound absorbing member | Good | Excellent | Excellent | Excellent | Excellent |

TABLE 1-1-4

|  | Example 6 | Example 7 | Example 8 | Example 9 |
|---|---|---|---|---|
| Presence/absence of cuts | Presence | Presence | Presence | Presence |
| Angle θ1 of first cut with regard to tire lateral direction | 90° | 90° | 90° | 90° |
| Angle θ2 of second cut with regard to tire lateral direction | 60° | 45° | 30° | 15° |
| Interval of cuts (Interval t/width Ws × 100%) | 5% | 5% | 5% | 5% |
| Depth of cuts (Depth d/thickness D × 100%) | 20% | 20% | 20% | 20% |
| High-speed durability (reached speed: km/h) | 350 | 350 | 350 | 340 |
| Durability of band-like sound absorbing member During high strain | Good | Good | Good | Good |
| Durability of band-like sound absorbing member At low temperature (−20° C.) | Good | Good | Good | Good |
| Collapsing of block of band-like sound absorbing member | Excellent | Excellent | Excellent | Excellent |

TABLE 1-2-1

|  | Example 10 | Example 11 | Example 12 | Example 13 | Example 14 | Example 15 |
|---|---|---|---|---|---|---|
| Presence/absence of cuts | Presence | Presence | Presence | Presence | Presence | Presence |
| Angle θ1 of first cut with regard to tire lateral direction | 90° | 90° | 90° | 90° | 90° | 90° |
| Angle θ2 of second cut with regard to tire lateral direction | 45° | 45° | 45° | 45° | 45° | 45° |
| Interval of cuts (Interval t/width Ws × 100%) | 15% | 30% | 45% | 60% | 90% | 95% |
| Depth of cuts (Depth d/thickness D × 100%) | 20% | 20% | 20% | 20% | 20% | 20% |
| High-speed durability (reached speed: km/h) | 350 | 350 | 340 | 340 | 340 | 330 |

TABLE 1-2-1-continued

|  |  | Example 10 | Example 11 | Example 12 | Example 13 | Example 14 | Example 15 |
|---|---|---|---|---|---|---|---|
| Durability of band-like sound absorbing member | During high strain | Excellent | Excellent | Excellent | Excellent | Excellent | Good |
|  | At low temperature (−20° C.) | Excellent | Excellent | Good | Good | Good | Good |
| Collapsing of block of band-like sound absorbing member |  | Excellent | Excellent | Excellent | Excellent | Excellent | Excellent |

TABLE 1-2-2

|  |  | Example 16 | Example 17 | Example 18 | Example 19 | Example 20 |
|---|---|---|---|---|---|---|
| Presence/absence of cuts |  | Presence | Presence | Presence | Presence | Presence |
| Angle θ1 of first cut with regard to tire lateral direction |  | 90° | 90° | 90° | 90° | 90° |
| Angle θ2 of second cut with regard to tire lateral direction |  | 45° | 45° | 45° | 45° | 45° |
| Interval of cuts (Interval t/width Ws × 100%) |  | 15% | 15% | 15% | 15% | 15% |
| Depth of cuts (Depth d/thickness D × 100%) |  | 30% | 50% | 60% | 80% | 90% |
| High-speed durability (reached speed: km/h) |  | 350 | 350 | 350 | 350 | 350 |
| Durability of band-like sound absorbing member | During high strain | Excellent | Excellent | Excellent | Excellent | Good |
|  | At low temperature (−20° C.) | Excellent | Excellent | Excellent | Good | Good |
| Collapsing of block of band-like sound absorbing member |  | Excellent | Excellent | Excellent | Good | Good |

As seen from Table 1-1 and Table 1-2, the pneumatic tires of Examples 1 to 20 all had simultaneously improved high-speed durability, durability of the band-like sound absorbing member during high strain, durability of the band-like sound absorbing member at a low temperature (−20° C.), and collapsing of the band-like sound absorbing member, as compared to the conventional examples.

On the other hand, in Comparative Example 1, the shape of the cuts was a rectangular groove extending in the tire lateral direction, and therefore, the improving effect of high-speed durability was low without a heat dissipating effect. Furthermore, in Comparative Example 2 and Comparative Example 3, only a plurality of cuts extending in the tire lateral direction or tire circumferential direction were provided, and therefore, an effect of increasing the heat dissipation area of the band-like sound absorbing member was not significantly achieved, and thus an improving effect of high-speed durability was low. Furthermore, in Comparative Example 4, the cuts were disposed so as to mutually intersect at an angle of 45° with regard to the tire lateral direction, and therefore, collapsing of a block occurred on the band-like sound absorbing member, and the blocks rubbed against each other, which resulted in damaging of a portion of the band-like sound absorbing member.

The invention claimed is:

1. A pneumatic tire, comprising:
an annular-shaped tread portion extending in a tire circumferential direction;
a pair of sidewall portions disposed on both sides of the tread portion; and
a pair of bead portions disposed on an inner side in a tire radial direction of the sidewall portions; wherein
a band shaped sound absorbing member is adhered on an inner surface of the tread portion in the tire circumferential direction;
the band shaped sound absorbing member has a plurality of cuts extending in two mutually intersecting directions, and of the cuts, a cut extending in one direction is a cut extending parallel with regard to a tire lateral direction or tire circumferential direction, an absolute value of a difference in angles of the cuts extending in the two mutually intersecting directions being from 15° to 90°;
the plurality of cuts have a closed state which transitions to an open state when the pneumatic tire deflects during a rolling motion;
the cut extending in one direction extends parallel with regard to the tire circumferential direction; and
a depth d of the cuts is from 55% to 80% with regard to a thickness D of the band shaped sound absorbing member.

2. The pneumatic tire according to claim 1, wherein an interval t of the cuts is from 5% to 90% with regard to a width Ws of the band shaped sound absorbing member.

3. The pneumatic tire according to claim 1, wherein a volume of the band shaped sound absorbing member is from 10% to 30% with regard to luminal volume of the tire.

4. The pneumatic tire according to claim 1, wherein the band shaped sound absorbing member has a missing portion in at least one section in the tire circumferential direction.

5. The pneumatic tire according to claim 2, wherein a volume of the band shaped sound absorbing member is from 10% to 30% with regard to luminal volume of the tire.

6. The pneumatic tire according to claim 5, wherein the band shaped sound absorbing member has a missing portion in at least one section in the tire circumferential direction.

7. The pneumatic tire according to claim 1, wherein a volume of the band shaped sound absorbing member is from 22% to 30% with regard to luminal volume of the tire.

* * * * *